R. R. PARRY.
DISH WASHING MACHINE.
APPLICATION FILED JUNE 8, 1906.

927,590.

Patented July 13, 1909.
5 SHEETS—SHEET 1.

R. R. PARRY.
DISH WASHING MACHINE.
APPLICATION FILED JUNE 8, 1906.

927,590.

Patented July 13, 1909.
5 SHEETS—SHEET 4.

WITNESSES

INVENTOR
Robert R. Parry
BY Munn & Co
ATTORNEYS

R. R. PARRY.
DISH WASHING MACHINE.
APPLICATION FILED JUNE 8, 1906.

927,590.

Patented July 13, 1909.
5 SHEETS—SHEET 5.

WITNESSES

INVENTOR
Robert R. Parry
BY
ATTORNEYS

UNITED STATES PATENT OFFICE.

ROBERT R. PARRY, OF NEW YORK, N. Y., ASSIGNOR TO AUTOMATIC HOTEL SERVICE CO., A CORPORATION OF MAINE.

DISH-WASHING MACHINE.

No. 927,590.      Specification of Letters Patent.      Patented July 13, 1909.

Application filed June 8, 1906. Serial No. 320,728.

*To all whom it may concern:*

Be it known that I, ROBERT R. PARRY, a citizen of the United States, and a resident of the city of New York, borough of Manhattan, in the county and State of New York, have invented a new and Improved Dish-Washing Machine, of which the following is a full, clear, and exact description.

This invention relates to machines for washing dishes in large quantities, and it is especially useful in restaurants, hotels and similar places.

The object of the invention is to produce a machine which is simple in construction and which will operate quickly and effectively to wash dishes of different shapes and sizes, continuously, without danger of breaking the same, and which will operate, after washing the dishes, to sort them.

It is also an object to construct the machine so that it will be compact and occupy little floor space; the arrangement being such that the machine may be quickly set up for practical use.

A further object is to construct the machine so that the washing operation will proceed uninterruptedly, the soiled dishes being fed continuously to the machine, and continuously delivered therefrom. The operation of the machine is substantially automatic throughout, so that it is only necessary for an attendant to feed the plates or dishes to the machine.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Fig. 3 is a central, vertical section, along the line x—x of Fig. 2, certain of the interior parts being shown in readiness for the reception of a dish. Fig. 8 is a face view of one of the dish-saddles made use of.

In a general sense, my present invention comprises a cleansing tank; a rotatable dish-carrier, adapted to receive and support dishes, convey them into and along the interior of said tank, and duly thereafter release the same; and means for imparting power and motion to said dish-carrier.

It further comprises in a general sense, a closed cleansing tank, for containing a cleansing fluid, said tank having a suitable feed opening; a rotatable dish-carrier adapted to receive, support, convey and release dishes as above specified; means for forcibly dashing the liquid contents of said tank against the dishes aforenamed, when supported by, and moving with said dish-carrier, the latter being constructed to this end; and means for imparting power and motion to said dish-carrier.

It still further comprises, in a general sense, a main cleansing tank having a suitable delivery opening; a rotatable dish-carrier, adapted to receive, support, convey and release dishes as hereinbefore specified; a rinsing tank at the delivery opening of said main tank, and receiving the dishes released by said dish-carrier; means for removing from said rinsing tank the dishes delivered, and relatively as delivered, thereto by said dish-carrier; and means for imparting power and motion to said dish-carrier.

In carrying out my invention I provide a cleansing tank 1, of any suitable material, preferably semi-cylindrical in cross-section, suitably supported in a manner to render the same stationary, as by means of connected standards or legs 2, and adapted to contain a cleansing fluid, as water.

There is journaled at and centrally along the upper edges of the opposite side-pieces of the tank 1, a main shaft 5, which has a fixed axis of movement, and is extended somewhat beyond said tank at one side thereof to receive a pulley 6, whereby said shaft may be driven by means of a belt 7, leading from any appropriate source of power and motion.

There is loosely mounted on the shaft 5 a cylindrical dish-carrier, the lower portion of which projects downwardly into the tank 1, said dish-carrier, accordingly, having a fixed axis of movement. This dish-carrier may be of any suitable general construction, though preferably, and particularly where there is used in conjunction therewith a device, such as more particularly described hereinafter for dashing about the liquid contents of the tank 1, the same is of skeleton construction, and comprises spoked wheels 23, 24, suitably spaced along, and each loosely disposed on, the shaft 5, and connected at suitable intervals concentrically thereof by means of flat bed-pieces 28, each having appropriate openings and approximating the well-known form of a grate.

It will be observed that the dish-carrier construction thus far described, is free to rotate on, and independently of, the shaft 5; and to the end that the same may be thus rotated, upon power and motion being imparted to said shaft, an internal gear-wheel 27 is attached to the rim 25 of the wheel 24, in mesh with which internal gear-wheel, at all times, is a pinion 22, firmly mounted on a stub-shaft 21. This stub-shaft is here shown as operating in a suitable bearing supported by the end-piece of the tank 1 adjacent to the gear-wheel 27, the pinion 22 being arranged at the inner end of said stub-shaft, and a spur-wheel 9 being arranged at the outer end thereof, said spur-wheel being in mesh, at all times, with a pinion 8, mounted on the outwardly projecting, adjacent end of the shaft 5. Hence, upon shaft 5 being driven at a given rate of speed, as through the medium of the pulley 6 and belt 7, the dish-carrier construction thus far described, will, through the medium of the train of gearing just described, rotate on said shaft 5, independently thereof, at a much less rate of speed, and its direction of rotation, indicated by the arrows adjacent thereto in Fig. 3, will be opposite to that of said shaft 5, all as will be readily understood. Now, this same operation of the parts under discussion, may, in the absence of the belt 7, be effected by hand, by providing a suitable handle 10, in this instance attached to the spur-wheel 9.

Figure 5:
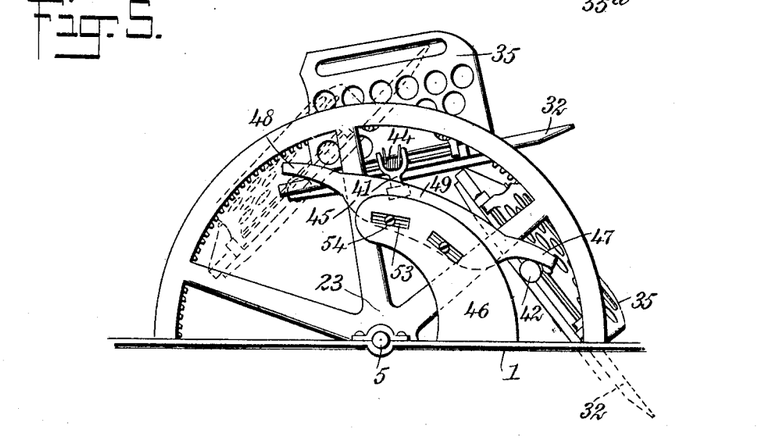
Fig. 5 is a detail, side elevation of the interior mechanism for automatically operating the dish holders.
Figure 6:
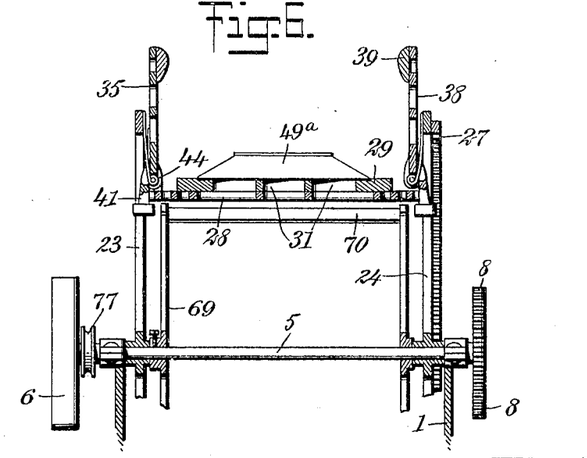
Fig. 6 is a central, vertical, longitudinal section, through the upper portion of the interior operating mechanism.
Figure 7:
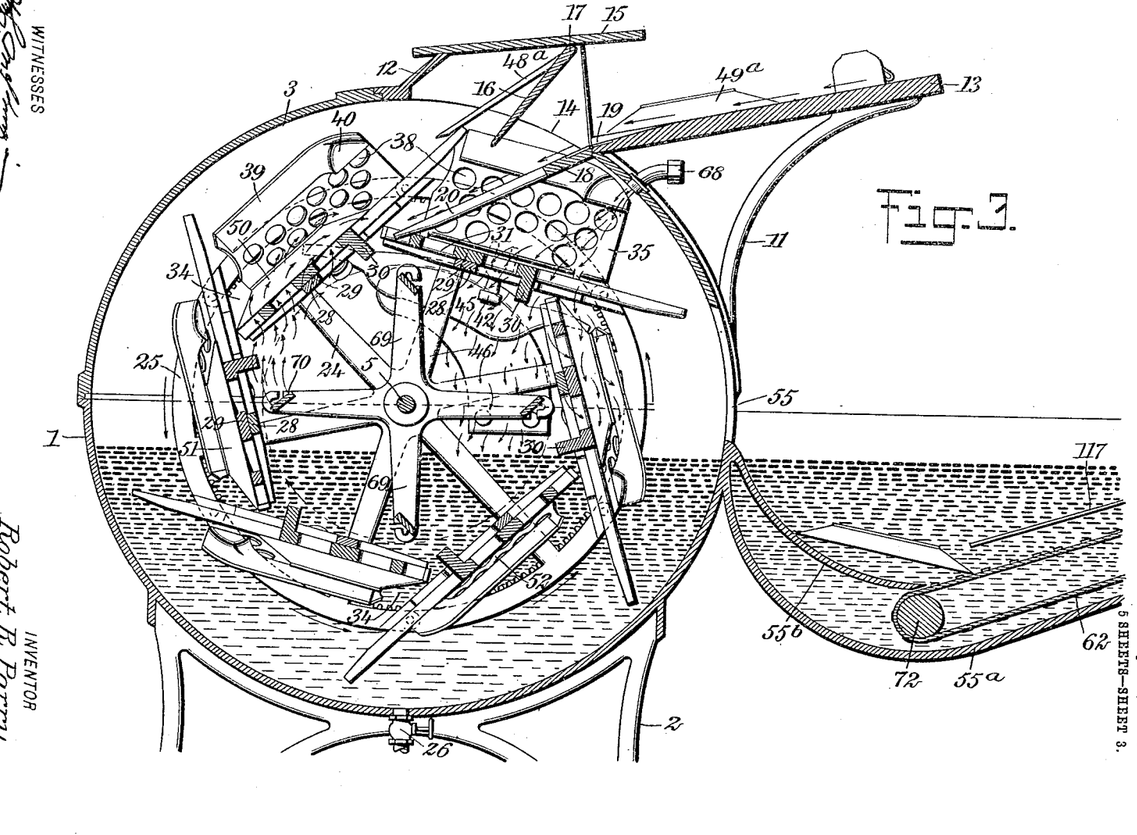
Fig. 7 is a detail, fragmentary view showing, mainly in elevation, the elements and features of construction availed of for driving the interior operating mechanism of the machine.
Figure 8:
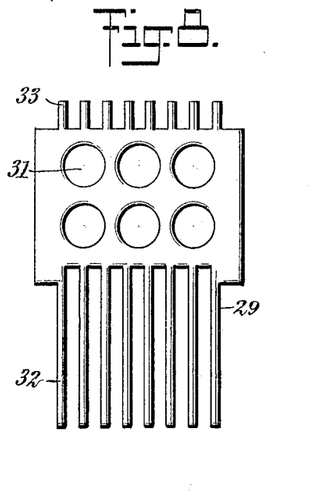
Figure 9:
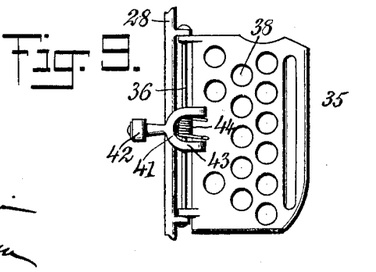
Fig. 9 is a plan view of one of the dish-holders made use of, certain minor parts coöperating therewith being also shown.

I further provide a flat dish-saddle 29, of wood or other suitable rigid material, of substantially the form indicated in Fig. 8, and attached to the dish-carrier aforenamed parallel with the longitudinal axis thereof. This dish-saddle serves to receive and sustain a dish, as 50, to be cleansed, as will hereinafter more fully appear. Again, it is essential that means be provided for temporarily holding said dish in place against said dish saddle; and in this connection I provide, (see Figs. 6 and 9), at one side of the bed-piece supporting said wash-board, a dish saddle 35, in the general form of a plate having openings 38 formed therethrough. Said dish-holder is attached to the bed-piece with which it coöperates after the manner of a hinge, as by means of the rod 36 extending through registering lugs projecting from said bed-piece and said dish-holder, respectively, as clearly illustrated in Fig. 9. Said dish-holder is further provided, at its inner side and near its free edge, with a contact bead or keeper 39, of wood or other suitable material, said keeper merging at its rear extremity, considered with respect to the direction of rotation of the dish-carrier as a whole, into a boss 40, as clearly illustrated in Fig. 3, and whose function will be more fully explained hereinafter. It is further desirable that said dish-holder shall, at all times, tend to elastically and automatically adjust itself along and parallel with the upper surface of the dish-saddle with which it coöperates, or so that its cushion 39 shall normally impinge, and exert an elastic holding force upon, a dish, as 50, when in position upon said dish-saddle; and to this end I provide a spiral spring 44, whose coils encircle the rod 36, and whose ends are disposed so that the tendency of said spring shall be, at all times, to elastically urge said holder into the position above referred to; and for automatically urging, at a desired point in the rotative movement of the dish-carrier as a whole, said dish-holder out of its said normal position, against the tendency of its controlling spring 44, and as into the position indicated in Fig. 6, where its coöperating dish-saddle is accordingly exposed in order to receive a dish, I suspend from the rod 36 a dog 41 which coöperates with a cam 45. The upper inner portion of said dog, which has a swinging action on the rod 36, is forked, as at 43, and between the opposing members thereof is disposed the spring 44. It is essential now, that means for tripping said dog, at a suitable point in the rotative movement of the dish-carrier as a whole, and in a manner to lift, for the release of such dish as may occupy the dish-saddle 29, the holder 35 against the tendency of its controlling spring 44, said dog coöperating with said holder accordingly, be provided; and to this end I purpose making use of a cam 45, supported, adjustably as clearly indicated in the drawings, by any appropriate supporting medium, as the bracket 46, attached to and rising from the tank 1, at one side thereof, as shown in Fig. 3. This cam has a suitably-shaped working-face, clearly illustrated in Fig. 5 of the drawings, and said cam-face is engaged, in the practical operation of the machine, by the depending, somewhat outwardly projecting stem of the dog 41, or a roller 42 rotatably arranged thereon.

It may be here pointed out that by reason of the elastic character of the holder 35 dishes varying quite considerably in the matter of depth may be placed, one at a time, upon the dish-saddle 29 and there elastically held through the medium of said holder, except upon the latter being lifted, as through the tripping of the dog 41, in the manner just described, said dog coöperating with said dish-holder to this end.

Figure 1:
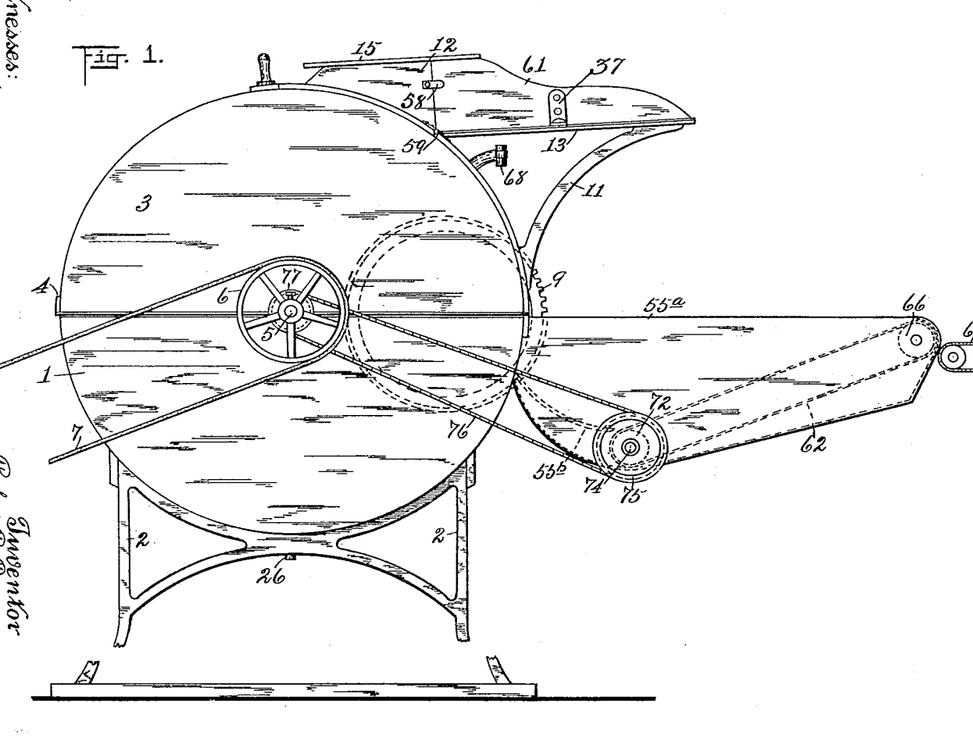
Figure 1 is a side elevation of a dish-washing machine embodying my said improvements.

While a dish may, with the construction thus far described, be placed, as directly by an attendant, upon the dish-saddle 29, there held temporarily by the holder 35, and parts coöperating therewith, then conveyed, upon power and motion being applied to the shaft 5, into and along the interior of tank 1, (thus subjecting said dish, a suitable quantity of cleansing fluid being contained in said tank, to a cleansing operation), and thereafter finally released from said dish-saddle, it is clear that duplicates of the holder 35, with the parts herein specified as coöperating therewith, may be arranged for similar operation at the opposite sides of the bed-piece 28. Again, a plurality of said bed-pieces, each having a dish-saddle, as 29, superimposed thereon as hereinbefore explained, may be arranged at suitable intervals circumferentially, as it were, of the general dish-carrier construction, and one or a pair of said holders 35, with the parts aforenamed coöperating therewith, respectively, may be arranged in conjunction with each of said bed-pieces, all as clearly indicated in the drawings. I further make use of a dasher for dashing about the liquid contents of tank 1, in the practical operation of the machine as a whole. This dasher, in this instance, comprises (Figs. 3 and 6), opposing hubs suitably spaced along, and firmly secured to, the shaft 5, each of said hubs having a plurality of radial arms 69 projecting therefrom, and paddles 70, each connecting the opposing arms, at the free ends thereof, of said hubs, respectively. Said dasher, being firmly mounted on, and hence moving with, the shaft 5, moves at a greater rate of speed than the dish-carrier aforenamed, and its direction of movement is opposite to that of said dish-carrier. Again, where the dasher aforenamed is availed of, it becomes particularly desirable that the main cleansing tank be substantially closed at all points, thus practically housing all of the interior operating parts of the machine. In this connection I make use of a hood 3, hinged, as along its edge 4, to the main tank 1, and disposed on the latter so as to form therewith, under normal conditions, an enlarged cleansing tank or casing of a cylindrical cross-sectional contour. This hood 3 has a feed opening 14, at its upper, rearward portion, considered with respect to the direction of movement of the dish-carrier aforenamed; and at said opening 14 there is arranged a hopper 12, consisting of suitable upright side-pieces and a top-piece 15, access to said feed opening being had by way of said hopper, whose entrance is clearly indicated in Fig. 3. I further provide a stationary feed-bed 13, which projects at a somewhat upward inclination away from the entrance to the hopper 12, any appropriate means being employed for supporting the same, particularly its outer end-portion, as the opposing brackets 11, Fig. 1. There is hinged to this feed-bed, by means of hinges 19, a feed-drop 18, which projects into the interior of the hood 3, by way of the opening 14, said feed-drop having a somewhat greater inclination than the bed 13, when the parts are adjusted as indicated in Fig. 3. It is provided, at its inner portion with a plurality of fingers 20, to which more specific reference will be made hereinafter.

For controlling the entrance to the hopper 12 I provide a gravity door 16, suspended, by means of trunnions, or the like, at opposite points indicated by the numeral 17, Fig. 3. Under normal conditions this door occupies substantially the position indicated in Fig. 4, where it serves to close the entrance to the hopper 12.

After each dish shall have been subjected to a primary cleansing operation, in the manner hereinafter described, it passes out of the main tank 1, by way of a delivery opening 55, with which said tank is provided and which may extend upwardly into the adjacent wall of the hood 3, when the latter is availed of, and gravitate downwardly along a bridge $55^b$, curved downwardly from said delivery opening and projecting into a rinsing tank $55^a$, the latter being suitably supported, as by forming the same integral with the adjacent wall of tank 1, or otherwise as may be found convenient in practice.

Figure 2:
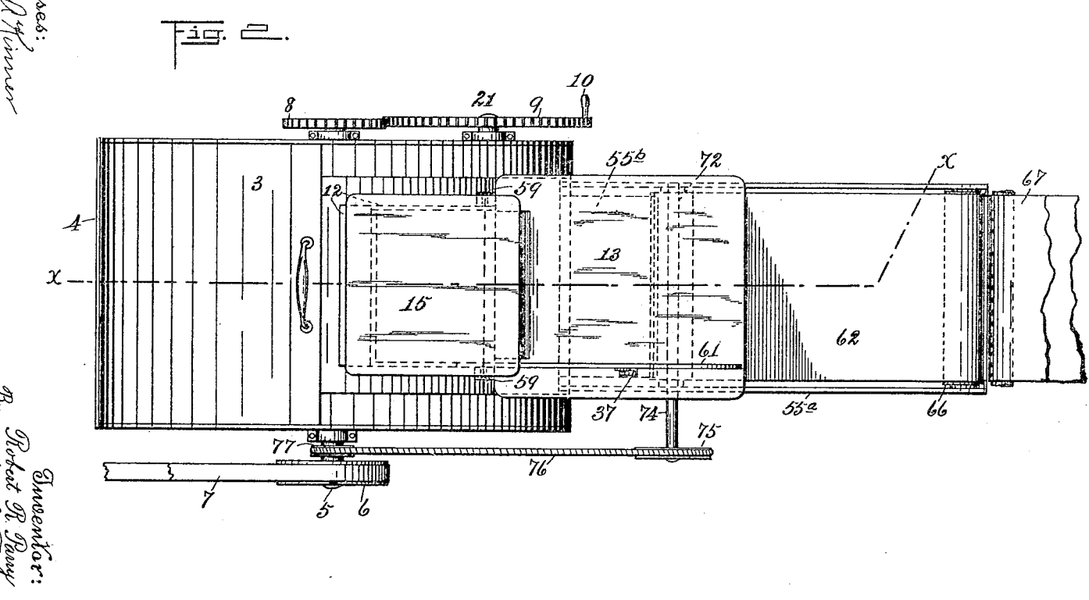
Fig. 2 is a plan view thereof.

The tank $55^a$ is adapted to contain a cleansing fluid, and each dish passing therethrough is subjected to a further cleansing or rinsing operation. For removing the dishes from the tank $55^a$ I journal at a low point in the opposite side-members of said tank, a roller 72, and at a higher point, at the delivery end of said tank, an additional roller 66, on which rollers, 72 and 66, operates an endless apron 62. Any appropriate means may be availed of for imparting power and motion to either of the rollers 72, 66, and hence to the apron 62; although in this connection, and to the end that the movement of said apron shall bear a definite relation to the movement of shaft 5, I extend the axial portion 74 of the roller 72 outwardly and somewhat beyond one side of the tank $55^a$, for the reception of a sheave 75, on which operates a rope-drive 76, leading from a sheave 77, firmly mounted on shaft 5, the relative diameters of the sheaves 75 77 being appropriate to the attainment of the end above alluded to, and all as clearly indicated in Figs. 1 and 2 of the drawings.

The lower end of the bridge 55ᵇ terminates slightly above the adjacent, lower extremity of the upper run of the apron 62, to facilitate the advancement of each dish moving downwardly along said bridge partially onto said apron; and in practice, the outer face of the apron 62 may be provided with transverse cleats or ribs, as clearly indicated in Fig. 3 of the drawings, said cleats or ribs serving to facilitate the picking up of a dish by said apron as the latter is continuously moved in operation.

The direction of rotation of shaft 5 is such that the roller 72 is properly turned, through the medium of the rope-drive 76 and sheave 75, to move the upper run of the apron 62, with any plate or plates thereon, in the direction of the delivery end of tank 55ᵃ, where delivery of such plate or plates to any appropriate receiving medium, as the endless apron 67, is effected, as will be clearly understood. Again, a guard 117, may be disposed firmly within the tank 55ᵃ, somewhat above and at an inclination parallel with the upper run of the apron 62, this guard serving to insure the picking up of only one dish at a time, by the apron 62, and preventing the picking up of two or more dishes in an overlapped condition, all as will also be clearly understood.

Tank 1 is provided along its bottom wall with a draw-off cock 26, clearly indicated in Fig. 3; and where the hood 3 is used, this is provided with an inlet nozzle 68, by means of which, in conjunction with cock 26, a cleansing fluid may be continuously introduced to the interior of tank 1. Within tank 1 the primary cleansing operation is performed, said tank containing a suitable quantity of cleansing fluid, as hot water to which soap may have been added; and within tank 55ᵃ the final cleansing or rinsing operation is performed, the last-named tank being intended to contain a suitable quantity of cleansing fluid, as clear water, hot or cold.

A more specific description of certain of the minor parts illustrated in the accompanying drawings, and incidentally an explanation of the general operation of the machine as a whole, may be given as follows: Each dish-saddle, (Fig. 8), made use of, comprises a body 30, substantially rectangular in form and provided with a plurality of enlarged openings 31, the purpose of which will more fully appear hereinafter. It is further provided with extended and stub-fingers 32, 33, at its rear and front edges, respectively, considered with respect to the direction of rotation of the dish-carrier aforenamed; and it is held removably in conjunction with its coöperating bed-piece by any common and appropriate medium, as a lug 30, projecting therefrom and through said bed-piece by way of one of the latter's openings, aforenamed. It will be observed that irrespective of the lug 30, the dish-saddle 29 is held to its coöperating bed-piece through the action of its coöperating dish-holder 35, except during the passage of said dish-saddle through the upper arc of its general course of movement. Where a plurality of dish-saddles, as 29, are used, the arrangement thereof is such that the fingers 32 of one dish-saddle project across the forward edge of the next following one, as the dish-carrier rotates, thus forming, as it were, pockets 34, at intervals circumferentially of the dish-carrier, which are adapted each to receive a dish in a manner which will appear more fully hereinafter. Each cam 45 made use of is symmetrical in form, as shown, and presents an elongated body 49, which merges into tips 47, 48, at its rear and front ends, respectively. To permit a due adjustment of said cam relatively to the feed opening 14, the bracket 46, supporting said cam, is provided with an elongated opening 53, and through this opening project the clamping screws or bolts 54, availed of for firmly securing said cam, when thus adjusted, to its said supporting bracket. Cam 45 is situated in the path of movement of the dog 41, and so that the working-face of its tip 47 is primarily engaged by the roller 42, carried by said dog. Said working-face is of a suitable inward curvature, from the free end of said tip to the adjacent, lower edge of the body 49, to insure, as roller 42 rolls therealong, a gradual downward and inward deflection of the stem of the dog 41, thus causing the latter's forked portion 43 to swing radially upward and outward with respect to the rod 36, thereby imparting a corresponding movement to the holder 35, against its controlling spring 44, said holder being maintained in this elevated position during the time required for the roller 42 to traverse the lower edge or working-face of the body 49, and hence giving ample time for a dish to descend along the feed-drop 18 and finds its position on the dish-saddle 29, located at said holder; whereupon said roller continues its course along the similarly curved working-face which extends along the tip 48, of said cam, thereby permitting the holder 35 to gradually and gently return, by the action of its controlling spring 44, into its normal or depressed position, where it serves to exert, as hereinbefore stated, an elastic holding force on the dish located thereunder, and on said dish-saddle.

The foregoing operation of the holder 35, and coöperating parts with respect to the cam 45, takes place as the dish-saddle 29 approaches, passes and advances from the feed-opening 14, as the dish-carrier aforenamed rotates. Hence, the holder 35 is elevated out of the plane of the feed-drop 18, and sufficiently to permit its free passage along and at one side of said feed-drop, the free-end portions of whose fingers 20 dragging accordingly across the upper face of said dish-saddle, during said operation of the parts, and said holder returning again to its normal position, as stated, after passing said feed-drop. Cam 45 is adjusted so that this operation, whereby the holder 35 is elevated out of its normal position, commences just before the fingers 32 are flush with the lower edge of the opening 55.

The relative arrangement of the feed-drop 18 and dish-saddle 29 is such that the fingers 20 alternate with the stub-fingers 33 and extended fingers 32; and as the latter, the fingers 32, traverse respectively, the spaces between said fingers 20, thus intersecting and passing continuously through and beyond said feed-drop as the dish-carrier rotates, their extremities engage the lower edge of the door 16, and swing the latter inwardly, as indicated in Fig. 3. As the extremities of the fingers 32 pass out of engagement with the door 16, the latter swings somewhat outwardly, but is temporarily checked in this action through the medium of the tongue 48$^a$, the lower edge of which is now engaged by the extremities of the fingers 32.

Figure 4:
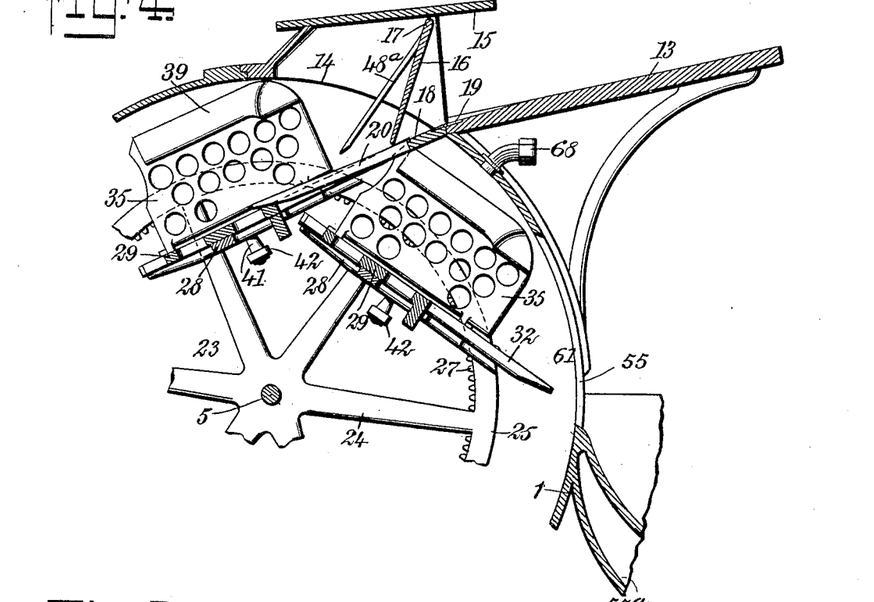
Fig. 4 is a fragmentary view, similar to Fig. 2, certain of the interior parts being shown as about to undergo adjustment for the reception of a dish.

As the dish-carrier continues to rotate, tongue 48$^a$ passes out of engagement with the fingers 32, and door 16 is free to swing into its normal position, as indicated in Fig. 4. In this way the door 16 is held open a sufficient space of time to allow a dish, as 49$^a$, to pass into the machine by way of the feed-drop 18, and the closing of said door with a too violent action is prevented.

Dishes are ordinarily fed to the machine one at a time, and each face downwardly, as illustrated in Fig. 3. The attendant holds a dish with its lower edge against the swinging door 16, releasing it as soon as said door is opened by the fingers 32; whereupon the dish gravitates downwardly along the feed-bed 13, thence downwardly along the feed-drop 18, where it comes to rest by reason of its lower edge engaging the stub-fingers 33, now, (see Fig. 3), somewhat obliquely intersecting the plane of said feed-drop, projecting somewhat beyond the same, and serving temporarily as a bumper for said dish. Now, as the dish-carrier continues to rotate, the dish-saddle 29, carrying said stub-fingers, gently picks up said dish from said feed-drop, by progressively, through the medium of its fingers 32, intersecting and passing beyond said feed-drop, and duly thereupon the holder 35 descends upon and holds the dish thus located, as hereinbefore explained.

At the left upper portion of Fig. 3 a dish 50 is illustrated as having been thus received in the machine, the adjacent holder being represented as having undergone partially its return movement for a holding effect thereon. When, however, a plurality of dish-saddles 29, with a holder or holders disposed for coöperation with each of them, are made use of, as indicated in the drawings, pockets 34, as it were, are formed at intervals circumferentially of the dish-carrier proper, each of said pockets being intended to receive a dish; and in this connection, (Fig. 3), a dish 50 is illustrated as having been duly received in the machine, and hence occupying one of said pockets, the adjacent holder being represented as having partially undergone its return movement for a holding effect on said dish, while at the dish 51, next in advance of the dish 50, the holder is shown as being in engagement with said dish 51, and at 52 no dish is shown, this arrangement being adopted so as to more clearly illustrate how the dish-holder grasps and holds any dish thereunder.

As the dish-carrier continues to rotate, and as the fingers 32 approach the delivery opening 55, roller 42 engages the tip 47, thus primarily moving the holder 35 slightly upward and liberating the dish thereunder for an initial movement by its own gravity downward along the dish saddle 29, the latter being now duly inclined to this end, with respect to the opening 55; but said dish is temporarily checked in this initial movement by the boss 40. As the dish-carrier continues to rotate, however, thus bringing the dish-saddle 29 duly in position with respect to the opening 55, holder 35 continuing to move upward accordingly, the dish beneath said holder becomes fully liberated, whereupon it gravitates gently downward along said dish-saddle, and along the bridge 55$^b$, by way of the opening 55, thus entering the rinsing tank 55$^a$, for a rinsing operation, and thereafter is removed from said rinsing tank, as by means of the endless apron 62, as hereinbefore explained.

It will be understood that the foregoing receiving and releasing operations of the interior parts remain practically unchanged whether a single dish-saddle, as 29, with a single holder, as 35, and parts coöperating therewith, are used; whether a pair of holders, as 35, and parts coöperating therewith respectively, are used at the opposite sides of a dish-saddle, as 29; or whether a plurality of wash-boards, as 29, arranged at intervals circumferentially of the dish-carrier proper, and a holder, as 35, or a pair thereof arranged for coöperation with each of said dish-saddles, all as clearly illustrated in the drawings, are availed of. Naturally, however, where a plurality of dish-saddles, arranged substantially as suggested, with a holder or holders arranged for coöperation with each of them, are used, said dish-saddles are successively brought opposite the openings 14 and 55, respectively, and the holders made use of accordingly undergo each its movements for holding and for releasing any dish thereunder. It will be further understood that a quantity of cleansing fluid, as water, is maintained within the tank 1 at a suitable level, the same being supplied directly into the tank 1, or by way of the nozzle or tap 68, in connection with a hose, where the hood 3 is used.

By reason of the fact that the shaft 5 carries the pinion 8, which is of smaller diameter than the gear-wheel 9, it follows that when the machine is being operated, either by a belt, as 7, or by hand, the dasher aforenamed will rotate at a high rate of speed, the cleansing fluid within tank 1 being accordingly picked up and thrown violently against the inner faces of the dishes which are undergoing the cleansing operation. In this connection, special attention is called to the feature of providing openings in each dish-saddle and other adjacent parts made use of, which openings serve to facilitate the free distribution of the cleansing fluid, and in this way the latter has access to all parts of said dishes. Attention is also called to the fact that the dasher aforenamed, whose paddles 70 are preferably arranged each at an inclination to the arms which support it, keeps the bath of cleansing fluid within tank 1 in good circulation, and tends to create currents therein which sharply impinge upon the faces of the dishes, thereby promoting the cleansing operation.

The covered portion of the hopper 12 proper is preferably hinged to the hood 3, as at the points 59, thereby permitting the ready tilting of said hopper in the direction of the bed 13, and away from the opening 14, as where direct access to the interior parts of the machine is desired, the vertical guard 61, removably secured to the bed 13, as by means of the small bracket 37, and having its inner end held in alinement with the adjacent side-piece of the hopper 12, as by means of a button 58, being first removed from said bed 13.

The general operation of the machine, whereby dishes, as plates, saucers, platters, cups, and the like, varying in size, contour and depth, are successively and automatically treated, from the reception thereof by way of the opening 14 to the delivery thereof at the discharge end of the apron 62, will be apparent from the foregoing description thereof.

It will be seen that my improved dish-washing machine is particularly well adapted for the purposes for which it is intended, and further that the same may be modified to a considerable extent, particularly as regards the means employed for imparting power and motion to the interior operating parts of the machine, for holding the dishes in conjunction with the dish-carrier proper, for agitating the cleansing fluid contained in tank 1, the specific construction of the dish-carrier proper, and various minor details of the general construction, without materially departing from the spirit and principle of my invention.

I claim:

1. A dish-washing machine comprising a tank; a main shaft journaled therein; a cylindrical dish-carrier loosely mounted on said shaft, and having a flat, perforated dish-saddle removably attached thereto parallel with its longitudinal axis; a cylindrical dasher firmly mounted on said shaft, within said dish-carrier, and having flat, elongated paddles arranged obliquely to the radii thereof and parallel with its longitudinal axis, said dish-carrier being provided with means for holding a dish against said dish-saddle; and connections between said shaft and said dish-carrier whereby the latter and said dasher may be simultaneously rotated.

2. A dish-washing machine comprising a tank; a cylindrical dish-carrier having a fixed axis of rotative movement therein, said dish-carrier being provided with a flat, rigid dish-saddle, attached thereto parallel with its longitudinal axis, and being further provided with clamping means for holding a dish against said dish-saddle; and means for rotating said dish-carrier.

3. A dish-washing machine comprising a tank; a cylindrical dish-carrier having a fixed axis of rotative movement therein, said dish-carrier being provided with a flat, rigid dish-saddle, attached thereto parallel with its longitudinal axis, and being further provided with clamping means for holding a dish against said dish-saddle; a dasher operating within said dish-carrier; and means for simultaneously actuating said dish-carrier and said dasher.

4. A dish-washing machine comprising a tank; a cylindrical dish-carrier having a fixed axis of rotative movement therein, said dish-carrier being provided with a flat dish-saddle, arranged parallel with its longitudinal axis and having a series of extended fingers; a feed-drop having a series of fingers projecting into the plane of movement of said dish-saddle and alternating with the extended fingers thereof, whereby said dish-saddle is adapted to intersect and pass continuously through and beyond said feed-drop, as said dish-carrier rotates; means for holding a dish against said dish-saddle; and means for duly rotating said dish-carrier.

5. A dish-washing machine comprising a tank; a rotatable dish-carrier therein, said dish-carrier being provided with a flat dish-saddle arranged parallel with its longitudinal axis; a feed-drop projecting into the plane of movement of said dish-saddle, and affording means for guiding a dish into position thereon; a device for holding such dish against said dish-saddle; and automatic means for causing said device to break its hold on said dish at a suitable point in the rotative movement of said dish-carrier.

6. In a dish-washing machine, in combination, a body having a feed-opening; a cylindrical dish-carrier mounted within said body and presenting a plurality of dish-saddles having each a series of fingers projecting tangentially away from said dish-carrier; a feed-drop hinged in said opening, projecting into the interior of said body and terminating in a series of fingers adapted to trail across said dish-saddles, as said dish-carrier rotates, and alternating with said dish-saddle fingers, the latter being thus permitted to pass between said feed-drop fingers to remove a dish or dishes therefrom; dish-holders attached to, and normally tending to engage, said dish-saddles; and automatic means for urging said dish-holders away from said dish-saddles when passing said feed-drop.

7. A dish-washing machine comprising a tank; a cylindrical dish-carrier mounted to rotate therein, said dish-carrier being provided with a flat dish-saddle arranged parallel with its longitudinal axis, and with a flat dish-holder movable radially toward and away from said dish-saddle and having a bead merging into a boss at its inner face; a dog coöperating with said dish-holder; and a cam for controlling said dish-holder through the medium of said dog under the rotative movement of said dish-carrier.

8. In a dish-washing machine, in combination, a body presenting a feed-opening and a delivery opening; a cylindrical dish-carrier mounted to rotate within said body; means at said feed-opening for delivering dishes to said dish-carrier, the latter being provided with dish-holders for holding the dishes thus delivered thereto; and a double-acting cam for controlling said dish-holders at said feed-opening to permit the reception of a dish by said dish-carrier, and also controlling said dish-holders at said delivery opening to permit the delivery of dishes at this point by said dish-carrier.

9. A dish-washing machine comprising a tank having a delivery opening; a cylindrical dish-carrier mounted to rotate within said tank, said dish-carrier being provided with a flat dish-saddle arranged parallel with its longitudinal axis, and with an elastically-controlled dish-holder, the latter having a boss at its inner face and normally tending to engage said dish-saddle; means for gradually tripping said dish-holder away from said dish-saddle, as the latter duly arrives at the delivery opening aforenamed, under the rotative movement of said dish-carrier; and means for duly rotating the latter.

10. In a dish-washing machine, in combination, a tank; a cylindrical dish-carrier mounted to rotate within said tank, said dish-carrier being provided with a flat dish-saddle arranged parallel with its longitudinal axis, and with a dish-holder, the latter hinged alongside of said dish-saddle and having a controlling spring normally tending to hold it to engagement therewith; and means whereby is insured the gradual tripping of said dish-holder out of engagement with said dish-saddle and the gradual return thereof automatically, upon motion being imparted to said dish-carrier; and means for duly rotating the latter.

11. A dish-washing machine comprising a tank; a cylindrical dish-carrier mounted to rotate within said tank, said dish-carrier being provided with a flat dish-saddle arranged parallel with its longitudinal axis; an inclined feed-drop serving to guide a dish into position upon said dish-saddle; means for determining the position of said dish along said dish-saddle; means for holding said dish against said dish-saddle when thus positioned; and means for rotating said dish-carrier.

12. A dish-washing machine comprising a tank; a cylindrical dish-carrier mounted to rotate therein, said dish-carrier being provided with a plurality of flat dish-saddles arranged parallel with its longitudinal axis, and projecting each therefrom at an angle to and beyond one of its next adjacent neighbors; a hinged feed-drop projecting into the plane of movement of said dish-saddles, adapted to trail across the same, and serving to guide dishes thereupon successively as said dish-carrier rotates, said dish-saddles being each adapted to intersect and pass continuously through and beyond said feed-drop; means for holding dishes against said dish-saddles; automatic means for insuring the escape of such dishes from the dish-saddles at a suitable point along the plane of movement of said dish-carrier; and means for duly rotating the latter.

13. A dish-washing machine comprising a tank having a feed-opening; a rotatable dish-carrier in said tank, said dish-carrier being provided with a radially-movable, elastically-controlled dish-holder normally occupying a position parallel with its longitudinal axis; a feed-drop hinged at said feed-opening and projecting into the path of movement of said dish-holder; automatic means for urging said dish-holder sufficiently out of its normal position to permit it to escape and pass by said feed-drop, as said dish-carrier rotates; and means for duly rotating said dish-carrier.

14. A dish-washing machine comprising a body; a dish-carrier rotatably mounted therein and presenting a plurality of flat, rigid dish-saddles adapted to receive dishes each with its face toward the axis of said dish-carrier; radially-movable, elastically-controlled dish-holders situated at the sides of said dish-saddles and coöperating therewith to hold dishes thereupon; automatic means for actuating said dish-holders to release the dishes from said dish-saddles; and means operating within said dish-carrier for dashing a cleansing fluid against said dishes when thus held.

15. A dish-washing machine comprising a tank having a feed-opening; a rotatable dish-carrier in said tank; a door disposed to normally close said opening, said dish-carrier being provided with a member adapted to engage and hold open said door temporarily, as said dish-carrier rotates; and means for duly rotating said dish-carrier.

16. A dish-washing machine comprising a tank having a feed-opening; a rotatable dish-carrier in said tank; a door disposed to normally close said opening, and having a tongue at its back, said dish-carrier being provided with a member adapted to successively engage said door and its tongue and accordingly hold open said door, as said dish-carrier rotates; and means for rotating said dish-carrier.

17. For a dish-washing machine, a dish-carrier comprising a cylindrical frame having a plurality of flat dish-saddles arranged, respectively, parallel with its longitudinal axis, and projecting each therefrom at an angle to and beyond one of its adjacent neighbors.

In testimony whereof I have signed my name to this specification in the presence of two subscribing witnesses.

ROBERT R. PARRY.

Witnesses:
F. D. AMMEN,
JNO. M. RITTER.